United States Patent
Zurcher et al.

(10) Patent No.: US 6,425,002 B1
(45) Date of Patent: Jul. 23, 2002

(54) APPARATUS AND METHOD FOR HANDLING DISPATCHING MESSAGES FOR VARIOUS APPLICATIONS OF A COMMUNICATION DEVICE

(75) Inventors: Rodd Bryan Zurcher; David Frank Baum, both of Lake Zurich; James Van Peursem, Hanover Park, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/198,095

(22) Filed: Nov. 23, 1998

(51) Int. Cl.[7] .............................................. G06F 15/173
(52) U.S. Cl. .................... 709/223; 709/202; 709/206; 709/224; 709/314
(58) Field of Search ................. 709/200–203, 709/204, 205–206, 213, 223–224, 227, 313–315; 455/442, 418–420, 461–463

(56) References Cited

U.S. PATENT DOCUMENTS

| | | | | |
|---|---|---|---|---|
| 5,335,347 A | * | 8/1994 | Foss et al. ................. | 709/314 |
| 5,517,662 A | * | 5/1996 | Coleman .................... | 709/201 |
| 5,634,005 A | * | 5/1997 | Matsuo ....................... | 709/206 |
| 5,696,902 A | * | 12/1997 | Leclercq et al. ............ | 709/223 |
| 5,742,905 A | * | 4/1998 | Pepe et al. .................. | 455/461 |
| 5,758,083 A | * | 5/1998 | Singh et al. ................ | 709/223 |
| 5,832,221 A | * | 11/1998 | Jones ......................... | 709/206 |
| 5,892,916 A | * | 4/1999 | Gehlhaar et al. ........... | 709/223 |
| 5,964,830 A | * | 10/1999 | Durrett ....................... | 709/200 |
| 6,073,142 A | * | 6/2000 | Geiger et al. ............... | 709/204 |
| 6,226,666 B1 | * | 5/2001 | Chang et al. ............... | 709/202 |

* cited by examiner

*Primary Examiner*—Bharat Barot
(74) *Attorney, Agent, or Firm*—Hugh C. Dunlop; Romi N. Bose; Hisashi D. Watanabe

(57) ABSTRACT

A communications device (10) with a processor having instructions that execute on the processor. The programmed instructions include a message manager program (16) for accepting and dispatching messages, one or more application programs (17, 18) for handling and presenting messages; and one ore more message client programs (30, 40) that receive messages from the message manager program (16) and provides them to the application program. The message manager program (16) accepts a registration from each message client program and sets rules, and message attributes to which the rules are to be applied for new messages.

11 Claims, 4 Drawing Sheets

APPARATUS AND METHOD FOR HANDLING DISPATCHING MESSAGES FOR VARIOUS APPLICATIONS OF A COMMUNICATION DEVICE

FIELD OF THE INVENTION

This invention relates to a communications device comprising a processor having instructions that execute the processor in the form of interacting computer programs. The invention relates to such a device with a message manager program and a message client program.

BACKGROUND OF THE INVENTION

In the field of communication devices it has become desirable to make provision for more than one application program for enabling a user of the device to interact with incoming and outgoing messages. Such messages may be conveyed to and from the device over any of a number of bearer services or "transports", as described in U.S. Pat. No. 5,509,000 of Oberlander. Examples of such bearer services are: short messaging service in GSM "global system or mobile" digital cellular radio systems; universal datagram protocol "UDP" packets; and internet protocol "IP" packets.

When there are multiple bearers conveying messages to and from multiple user applications, at least two possible alternative architectures are available. In the first alternative, a universal mailbox is provided. All messages arrive at and are dispatched from the universal mailbox, regardless of the application that creates the message or accepts the message. This a complex arrangement from the point of view of facilitating application development, because careful consideration needs to be given to the interaction to the different applications and the competition of applications for handling of messages in the universal mailbox.

An alternative architecture provides that each application has its own mailbox. This is a more modular approach that is suitable for unlimited expansion by addition of new applications. A message manager is required between the applications and the various transports to manage the receipt and dispatch of messages between the various applications and the various transports.

It would be desirable to provide a message manager and an interface to one or more applications in an object-oriented programming language such as Java (TM), but currently such a language has no defined application programmer interface (API) adequate for such a function. It would be desirable to create an API that facilitates the handling and dispatching of messages between a message manager and various applications in a clear and a convenient manner to ensure the correct messages are delivered to the correct applications and to ensure that applications only receive messages that are of interest to those applications.

DETAILED DESCRIPTION OF THE DRAWINGS

Figure 1:
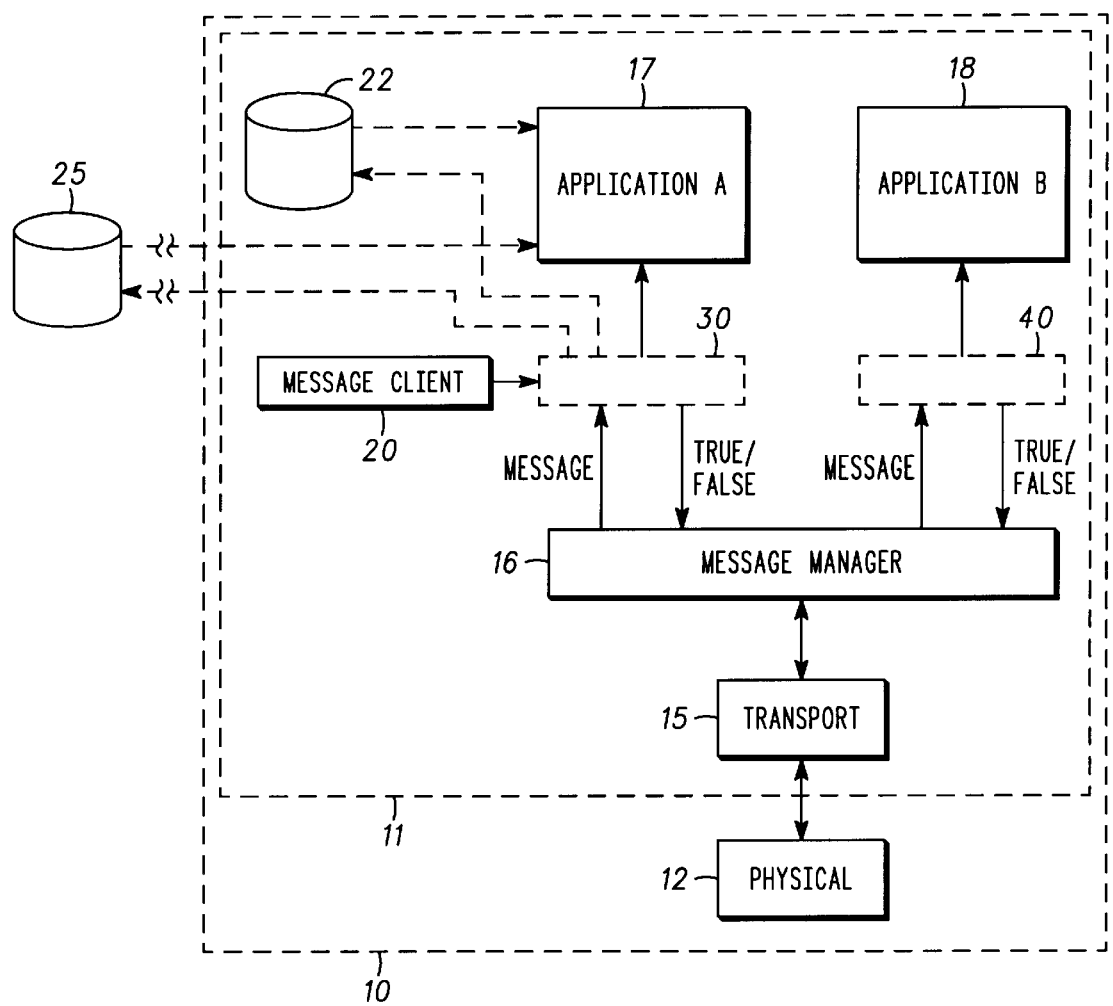
FIG. 1 is a block diagram of a communications device and its software structure.

Referring to FIG. 1, a communications device 10, such as a cellular telephone or a two-way mobile radio or a two-paging device e.g. a "Pagewriter"™ is shown, which comprises a microprocessor 11 coupled to a radio transceiver 12. The radio transceiver 12 will be referred to as the "physical" layer of the device, as it encompasses all physical functionality (such as channel selection, power control and time slot allocation or spreading or de-spreading), depending on the particular radio bearer that is being used by the communication device 10. The physical layer 12 communicates with the microprocessor 11 and with various software modules loaded into the microprocessor 11 and executing on that processor. It will be understood that the microprocessor 11 may also perform processes dedicated to the physical layer 12 but these need not be described in detail.

Within the microprocessor 11 there are various computer programs or software modules, including a transport program 15, a message manager program 16, and one or more applications. In the example shown, two applications are shown 17 and 18, labeled application "A" and application "B". Also shown is a message client 20 and a memory 22. FIG. 1 further illustrates a remote message store 25, which is not located within the communications device 10 but is in communication with the communications device 10. The remote message store 25 is shown as communicating with the message client 20, but this is shown for simplification. In fact the remote message store 25 uses the transport module 15 and the physical layer 12 to communicate with the message client 20 and also requires its own transport layer and physical layer (for example as described in U.S. Pat. No. 5,771,353 of Eggleston et al.) to establish this communication.

The applications A and B are programs that interact between a user of the communications device 10 and messages being received by and being received from the communications device 10.

In operation, the user interacts with these applications via any suitable user interface, typically a small screen and a keyboard or a screen and a pen and tablet interface. Examples of applications are an electronic mail application such as "Outlook" (™) by Microsoft Corporation or "Lotus Notes" (™), but there are many applications that may run on the processor 11 for handling and presenting messages and further examples are given below.

The operation will be described in broad outline and will again be described in greater detail. In broad outline, an outbound message is generated on one of the applications 17 and 18 and a message object is created and delivered to the message manager 16. The message manager 16 queues the message in an outbound message queue. The message manager 16 maintains a single queue or separate queue for each message type. The message manager 16 delivers the messages in a prioritized order to the transport program 15 which attempts to deliver the messages through the physical layer 12 to a destination (typically a server that is reached via radio base station). If the transport successfully delivers the message, it informs the message manager 16 that is ready to accept and deliver the next message. The particular ordering of the delivery of the messages by the message manager 16 to the transport layer 15 is unimportant. The ordering of messages may depend on what transport layer and what physical layer are available to the message manager, and further details can be found in copending patent application Ser. No. 08/720,984 of Pearce et al., filed on Oct. 15, 1996, now U.S. Pat. No. 5,910,951 and assigned to the assignee of the present invention, the specification of which is hereby incorporated by reference.

For inbound messages, the message manager 16 and the applications 17 and 18 require an orderly procedure for determining whether the inbound message is to be delivered to one application or the other application or both applications. The software language used for construction of the message manager 16 and the applications 17 and 18 is preferably an object oriented language such as Java (™). A class called MessageClient resides in the permanent instructions loaded in microprocessor 11. Upon receipt of a message, an instance 30 of the class is created for application A (this may be referred to as Message Client A). The message is delivered to Message Client A. Depending on the function of Message Client A, the message may be delivered to the application A. Alternatively, it may be delivered to memory 22 for later delivery to application A or they may be routed to remote storage 25. Similarly, the message is selectively delivered to Message Client B 40 and is delivered to application B. The selective delivery to Message Client A and Message Client B is described in greater detail below. The detailed description explains that the selective delivery of a message to one or both of the message clients 30 and 40 depends upon pre-registration of the respective message client with the message manager 16 and depends on attributes of messages for which the respective message client is registered with the message manager. It also depends on one or more rules in the message manager 16. The rule or rules in the message manager 16 is or are applied to attributes of each new message that arrives. Depending on the result of those rules, the message is delivered to one of those applications A or B or to both applications ( and indeed any further applications that may exist).

For a more detailed description of the preferred embodiment of the invention, the following terminology will be used:

Client:—A Java application that may both source and sink Messages.

Message:—Data, and the addressing information necessary to deliver the data to another client, and optionally additional attributes.

Transport:—A session layer protocol that may send messages, or receive messages. Examples include SMS, SMTP, POP3 and IMAP4.

Inbound message:—Messages entering the devices via a transport.

Outbound message:—Messages created by a client and leaving the device via a transport.

Handled message:—A message that has had delivery attempted by a transport (outbound case) or a message that has been accepted and processed by a client (inbound case).

Unhandled message:—A message that has been refused a delivery attempt by a transport (outbound case) or a message that has been refused processing by a client (inbound case).

Four scenarios in particular are now described, including a message client 30 or 40 registering with the message manager 16, a message client queuing an outbound message for delivery, a message client participating in the routing of an inbound message and a transport creating an outbound message delivery session.

For a client to either queue an outbound message for delivery or be able to receive an inbound message, it must first register with the message manager 16. The process of registering with the message manager does not actually register the client itself, rather a specific implementation 30 or 40 of a subclass of the Message Client object 20 is registered. Thus, an implementation of a subclass of the message client object 20 is registered as "Message Client A". Following registration, the message manager 16 is able to identify the name of the subclass implementation as "Message Client A" and for that subclass implementation, the message manager 16 maintains a record of the rules that are to be applied for that subclass and implementation upon receipt of a new message.

A message client provides two primary methods for the MessageManager:

SendComplete:—This method is called with a Message and a Status, and is used to inform a Client that a previously queued message has been sent.

Receive:—This method is used to give the Client an opportunity to accept a message. If after parsing the attributes or the body of the Message if the MessageClient decides it can process the Message it returns true, declaring the message handled. Otherwise the Client returns false declaring the Message not handled.

When a client registers a MessageClient with the MessageManager it also specifies what class of Messages it wants to be given a chance to accept. There are two classes: all, and unhandled only. MessageClients registered for all, will see every Message routed through the MessageManager, regardless whether another MessageClient has already handled the Message. MessageClients registered for unhandled will only be given an opportunity to accept messages that no other MessageClient has handled.

The message manager 16 maintains a table of messageClients identified by name (Message Client A, Message Client B etc.) and of attributes of messages for which that Message Client is registered (handled/unhandled, type).

Figure 2:
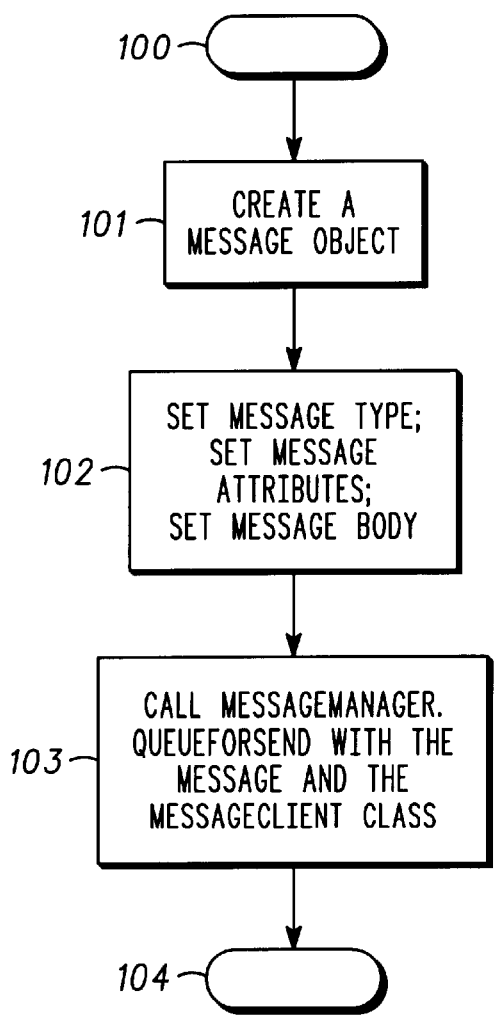
FIG. 2 is a flow diagram illustrating an outbound message queuing process.

The process of queuing a message for outbound delivery is now described, with reference to FIG. 2. The process starts at step 100 and in step 101 a message object is created. A message object comprises a payload (for example text and/or graphics) and attributes such as subject, recipient, type and handled or unhandled). In step 102, the message type is set, the message manager 16 is called, that class being "MessageManager.QueueForSend". This class is called with the message and the message client class. The outbound message being processed ends at step 104.

The above simple process corresponds to the following psuedocode

Create a Message object

Set Message type

Set Message attributes

Set Message body

Call MessageManager.QueueForSend with the Message and the MessageClient class.

MessageManager.QueueForSend will return a unique message ID that may be used by the client to remove the message from the outbound queue.

The Client will be notified by the MessageManager, via the MessageClient class, when a transport has attempted delivery of a queued message.

The message manager 16 does not actually trigger an outbound transport to run. It is the responsibility of the Client to actually trigger or direct a transport to run.

Figure 3:
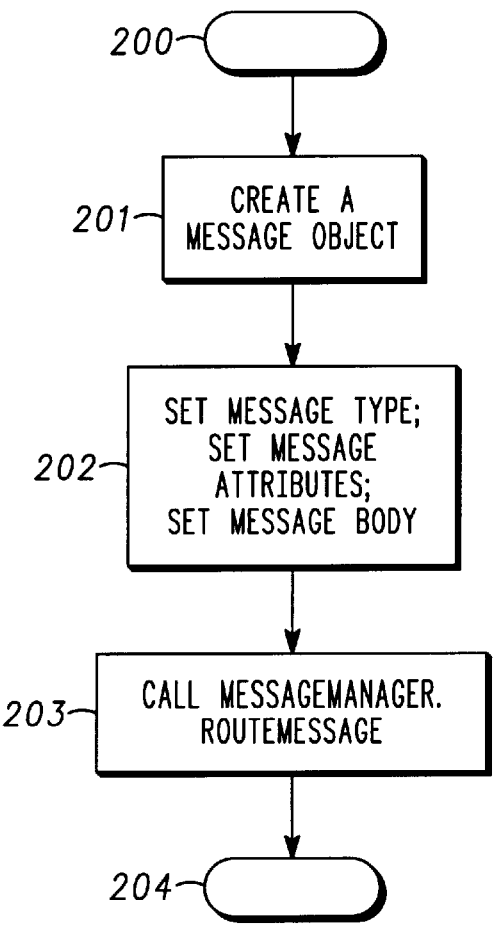
FIG. 3 is a flow diagram illustrating an inbound message routing process.
Figure 4:
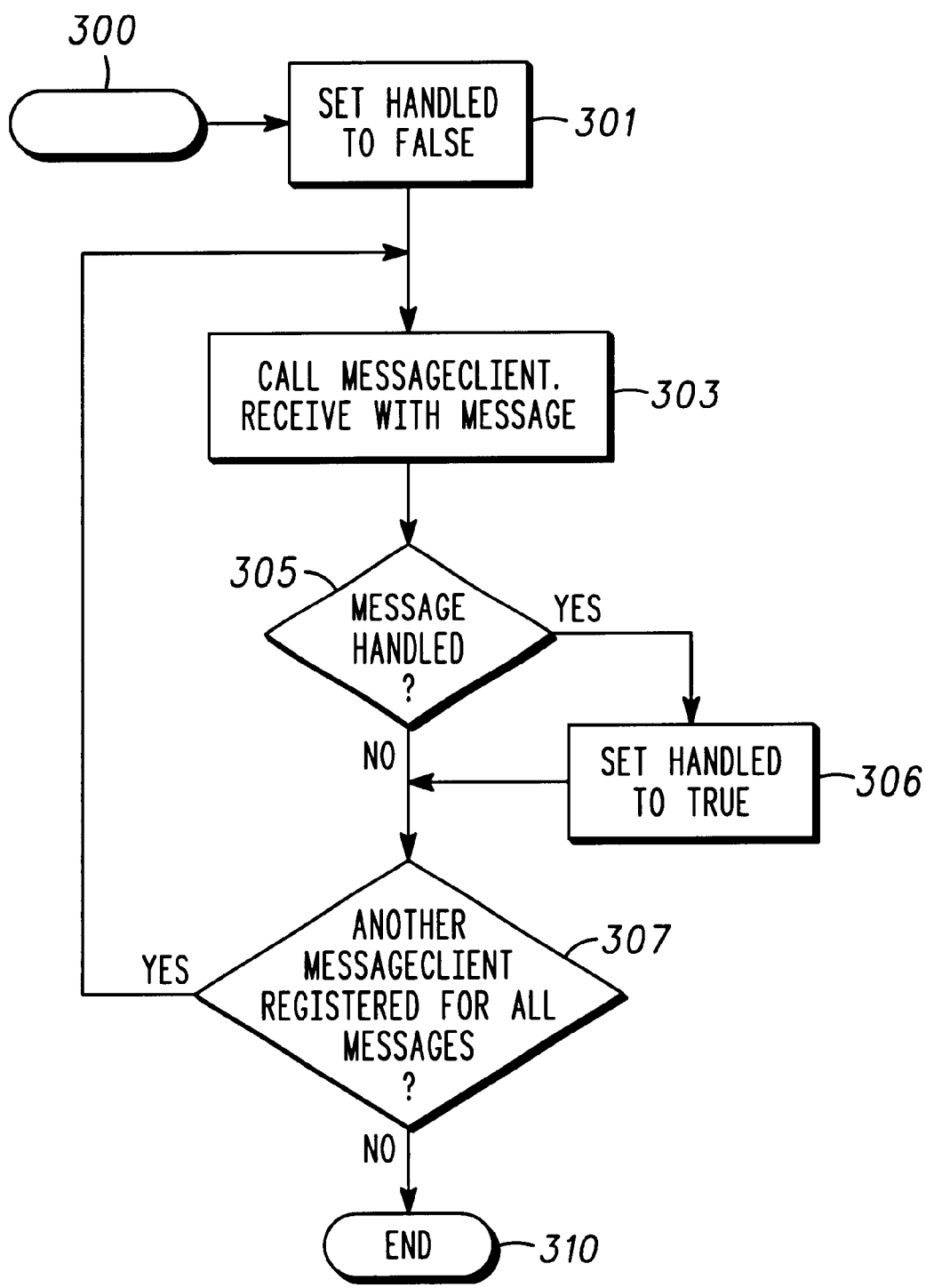
FIGS. 4 and 5 are flow diagrams illustrating processes performed by the message manager software of FIG. 1.

The process followed by a transport 15 to route an inbound message is somewhat similar and is illustrated in FIG. 3. Starting at step 200, a message object is created at step 201. In step 202 the message type is set the message attributes are set and the message body is set. In step 203 a class in the message manager is called, that class being "MessageManager.RouteMmessage". The process message performed by the transport is completed at step 204. The above described process is described by the following pseudocode:

Create a Message object
Set Message type
Set Message attributes
Set Message body
Call MessageManager.RouteMessage Referring now to FIG. 4, a process or method performed by the message manager 16 following from step 204 is illustrated. This process starts at step 300. In step 301, the attribute or flag "handled" is set to "false", and this step simply indicates that this message has not yet been handled by any message client or any application. Then, a loop begins for each message client that is registered for all messages. This loop will be performed upon receipt of any message and it will be performed for any message client (on behalf of its associated application) that desires to receive all messages. In step 303, the class "MessageClient.Receive" is called with the message.

When MessageClient.Receive is called, that subclass instance (e.g. message client A) delivers a result. The result delivered is a simple "true" or "false". "True" is delivered when the respective message client indicates that it has handled the message. "False" is delivered when the respective subclass indicates when it has not handled the message. As will be explained below, it is entirely within the choice of the programmer as to whether the message client subclass instance delivers "true" or "false". Thereafter, the process determines whether the message has been indicated as having been handled by the respective message client. If the respective message client has delivered "true," step 305 determines that the message has been handled, and in step 306, the flag "handled" in the message manager 16 is set to "true" for that message. In either case, the process proceeds to step 307, where the message manager 16 determines if there is another message client that is registered for all messages. If there is another message client that is registered for all messages, the process returns to the beginning of the loop and a message client is created for the next application (e.g. message client 40). If following step 307, there are no messaging clients that are registered for all messages, the process ends at step 310 and flow can proceed to the process illustrated in FIG. 5.

The above RouteMessage method in the message manager 16 is detailed in the following psuedocode:

```
Set handled to False
For each MessageClient registered for all Messages
Begin
    Call MessageClient.Recieve with Message
    if Message handled then
        set handled to True
End
```

Figure 5:
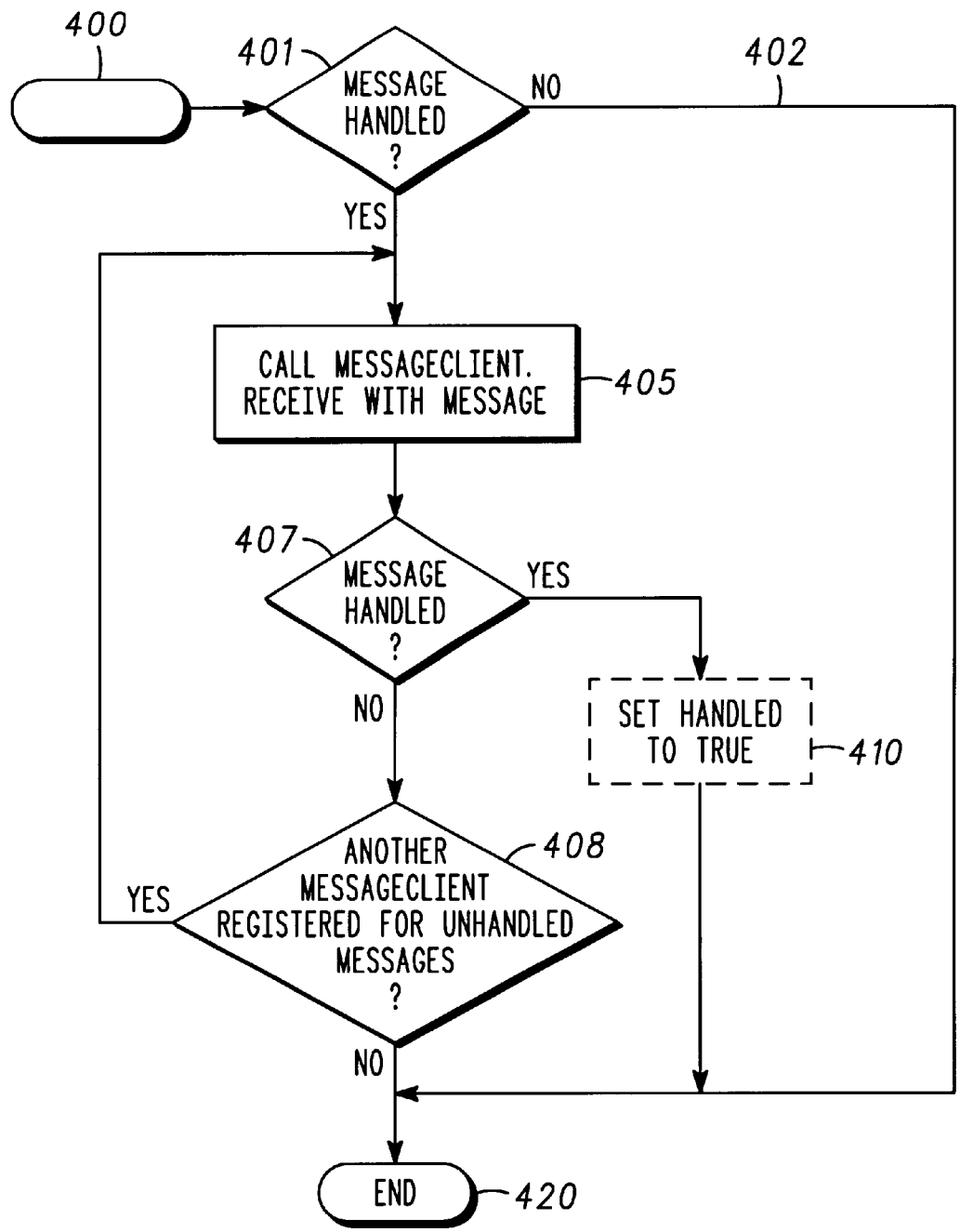

It may, incidentally, be noted that the process of FIG. 5 can be modified in the event that more than one type of message exists. Message types may include, SMS messages and internet messages. A message client may be registered for all SMS messages, or all internet messages, or all messages, whether SMS or internet. Thus, a message client may be registered for a first type of message or a second type of message or all messages. In such an example, step 307 can be modified to look for whether there is another message client that is registered for all messages for all message type. It may also be noted that a MessageClient can be created temporarily for the purpose of creating a call to that MessageClient and released immediately following the call.

Referring now to FIG. 5, a process is described that follows from the process of FIG. 4 and that is executed by the message minder 16. This process begins at step 400 and is bypassed at step 401 via a bypass path 402 in the event that the message flag for the current message is set at "true". Thus, step 401 determines whether the message has been handled, and if the message has been handled, the process immediately ends at step 420. In other words, the process at FIG. 5 executes for unhandled messages only, and therefore only executes for message clients that are registered for unhandled messages only. In the event that there is an unhandled message, the processor proceeds to step 404. In step 405, the class MessageClient.Receive is called with the message. As before, the message client (e.g. message client B indicated by reference numeral 40 in FIG. 1) delivers either "true" or "false" to the message manager 16. Following step 405, step 407 determines whether the message has been handled. If the message has not been handled, step 408 determines whether there are any other message clients that are registered with the message manager for unhandled messages only. If there are, the process returns to step 404.

If, following step 407 the indicated as having been handled, the process proceeds to optional step 410. In this optional step, the "handled" flag is set to "true" for that message. The program will then proceed to step 420. Step 410 is indicated as optional, because the particular transport that called "route message" may not care whether the message is handled at all by any application or any message client. If the underlying transport needs to know that the message has been handled, then step 410 is necessary.

When there are no further message clients that are registered for unhandled messages or when the message has been handled by one of the message clients, the process ends at step 420.

The above described process is illustrated by the following psuedocode:

```
if not handled then
Begin
    for each MessageClient registered for Unhandled
    Messages
    Begin
        Call MessageClient.Receive with Message
        if Message handled then
            end for loop
    End
End
```

There may be many message clients 30, 40, etc., that may be registered with the message manager 16. Message clients register in chronological order and the message manager 16 executes step 404 for the message clients in the chronological order in which they have registered. Thus, if applications A and B are both registered for unhandled messages only, message manager 16 will create subclass instance 30 first and if the instance of message client so created successfully handles a given message, message manager 16 will not create a message client instance 40 for application B, because flow will proceed from step 407 to step 420. The chronological order of registering of message clients with the message manager can be overridden such that the user or the program writer can devise a specific sequence in which message clients are to be created for a new message.

As before, a MessageClient can be created temporarily for the purpose of creating a call to that MessageClient and released immediately following the call.

It has been explained that the applications A and B may be electronic mail applications. Many other applications large and small can be devised with the structure described.

At a very minimum, there may be a message client created that has no corresponding application. At a very minimum this message client may have no function other than to deliver "true" for all messages. Such a trivial message client would simply consume all messages that arrive with no purpose. Or such a message client could, for example, simply count the incoming messages. Alternatively, it could count messages of a given type. For example it could count all fax messages and give an indication to the user that there are faxes that have arrived, so the user can turn to a connected fax machine to receive those messages. Another example of a simple message client would be a message client that extracts a sender's address and adds it to address book and it turns "false" to the message manager 16. Such a message client would build up an address book for all messages without interfering with operation of other applications interacting with the message manager 16. By returning "false" the message client would not interfere with the ability of other message clients to have the opportunity to receive the message. These are all examples of functions that can take place with the message client without necessarily invoking an application.

The message client can deliver a message to memory 22 or to remote storage 25 for later review when application A or application B is launched. Message client can return "true" if it wishes to indicate that it has successfully received the message and it wishes to prevent any other application from receiving that message or it can return "false" if it wishes to receive the message and simultaneously permit another application to receive the message.

It has been described how a message can have two attributes: a message type and a message handled flag. The message manager 16 applies rules to these attributes for each new message. There may, of course, be further attributes to which further rules can be applied, but adding more attributes and more rules adds complexity to the message manager 16 and it is preferred that such complexities are added to the message client 30. It is believed that the simple true/false delivery of the result by the message client and the provision of a few simple rules of the message manager provides sufficient flexibility for message clients to execute unlimited numbers of rules against a message and deliver true or false according to rules executed within the message client. As an example, a message client may only wish to handle messages during office hours and can return "false" at any time of day. This is an example of a rule that is executed in the message client. The possible rules and attributes executed by the message manager are illustrated in the following table. The table shows attributes as columns as rows.

|        | Handled | Unhandled | Don't Care |
|--------|---------|-----------|------------|
| Type A |         | X         | X          |
| Type B |         | X         | X          |
| Don't Care |     | X         | X          |

The table show six possibilities for rules that may be executed by the message manager. Conceivably a message manager could be devised to create a message client that is registered for handled messages only, but presently there is no apparent purpose for such a message client.

The computer programs illustrated in FIG. 4 and FIG. 5 in effect execute the rules illustrated in Table H, but will be appreciated by oneskilled in the art that there are many other ways of setting out the program that will create a message client in a selected manner depending on attributes of a message or attributes held in the message manager 16 and deliverable in a software call to the message manager.

For completeness, operation of an outbound delivery session is now described. An outbound transport must iterate over all the messages (of a given type) in the MessageManager's queue. Just as in the inbound case the transport can inform the MessageManager of which messages it actually handled and which ones it didn't. It's entirely up to the transport to determine if it can actually handle (deliver) a message.

There is a distinct difference between attempting to deliver a message and failing; and not handling the message at all. Typically a Client will set a special attribute on all of the messages it queues. At a later time when the Client triggers the transport to run, it passes the special attribute to the transport. The transport uses this information to determine which messages it should handle and which messages it should not, by intervention over message and sending messages that match the "special attribute", as set out in the following pseudocode.

Call MessageManager.OpenTransportSession with a message type
Save the MessageContext returned
Call MessageManager.GetMessage with the MessageContext
While GetMessage returns a message

```
Begin
    If the transport can handle this message then
    Begin
        Send the message over the transport
        Call MessageManager.SendComplete,
            with the MessageContext, Message, and the send
                status
    End
    else
        Call MessageManager.ReturnUnHandledMessage,
            with the MessageContext and Message,
        Call MessageManager.GetMessage with MessageContext
    End
    Call MessageManager.CloseTransportSession with
        the MessageContext
```

In summary, a communications device has been described comprising a processor having instructions that execute on the processor and it comprise: a message manager program 16 for accepting and dispatching messages; at least one application program 17, 18 for handling and presenting messages; and at least one message client program 30, 40, that receives messages from the message manager program and provides them to the application program. The message manager program accepts a registration from at least one message client program comprising at least one rule and at least one message attribute to which the rule is to be applied for new messages.

Similarly, a communications device has been described comprising a processor having first instructions 16 for message management, second instructions 17 or 18 for interacting between a message and the user; and third instructions 30, 40 for accepting a message from the first instructions and providing a message to the second instructions. The first instructions 16 accept a registration from at least one set of third instructions 30 or 40. The registration comprises at least one rule and at least on message attribute to which the rule is to be applied to new messages.

The above description has been given by way of example only, and modifications of detail can be made by one of ordinary skill in the art without departing from the spirit and skill of the invention.

We claim:

1. A communication device including a processor having instructions that execute on the processor and that comprises:
   a message manager program for accepting and dispatching messages;
   at least one application program for handling and presenting messages; and
   at least one message client program, each message client program corresponding to a particular application program, that receives messages from the message manager program and provides them to the corresponding application program,
   wherein the message manager program accepts a registration from each message client program including at least one rule and at least one attribute to which the rule is to be applied for new messages, and
   wherein the at least one attribute including a handled/not handled attribute of messages, the handled attribute indicates that a transport has attempted deliver of a particular massage or a client has processed the particular message whereas the not handled attribute indicates that the transport has refused delivery of the message or a client has refused processing of the message.

2. The device according to claim 1, wherein the at least one message client program is created upon receipt of a new message and released following selective delivery of the message.

3. The device according to claim 1, wherein the message manager selectively delivers the new message to a message client program dependent on the handled/not handled attribute of the message.

4. The device according to claim 3, wherein the message manager creates the message client program dependent on the handled/not handled attribute of the message.

5. The device according to claim 1, wherein the message attribute includes a message type attribute.

6. The device according to claim 5, wherein the message manager selectively delivers the new message to a message client program dependent on the message type attribute of the message.

7. The device according to claim 6, wherein the message manager creates the message client program dependent on the message type attribute of the message.

8. The device according to claim 1, wherein the registration comprises at least first and second attributes including a handled/not handled attribute and a message type attribute.

9. The device according to claim 8, wherein the message manager program, upon receipt of a new message, executes first and second rules applied against the first and second attributes respectively.

10. The device according to claim 9, wherein the message manager selectively delivers the new message to a message client program dependent on a result of executing the first and second rules against the first and second attributes.

11. A communication device including a processor having instructions that execute on the processor and that comprises:
    a set of first instructions for message management;
    at least one set of second instructions for interacting between message and a user; and
    at least one set of third instructions, each set of third instructions corresponding to a particular set of second instructions, for accepting a message from the first instructions and providing the message to the corresponding set of second instructions, wherein
    the first instructions accept a registration from each set of third instructions, the registration including at least one rule and at least one attribute to which the rule is to be applied for new messages, the at least one attribute including a handled/not handled attribute of messages, and the handled attribute indicates that a transport has attempted deliver of a particular massage or a client has processed the particular message whereas the not handled attribute indicates that the transport has refused delivery of the message or a client has refused processing of the message.

* * * * *

UNITED STATES PATENT AND TRADEMARK OFFICE
CERTIFICATE OF CORRECTION

PATENT NO. : 6,425,002 B1
DATED : July 23, 2002
INVENTOR(S) : Zurcher et al.

It is certified that error appears in the above-identified patent and that said Letters Patent is hereby corrected as shown below:

<u>Column 9,</u>
Line 22, please change "deliver" to -- delivery --
Line 23, please change "massage" to -- message --

<u>Column 10,</u>
Line 37, please change "massage" to -- message --

Signed and Sealed this

Thirty-first Day of December, 2002

JAMES E. ROGAN
*Director of the United States Patent and Trademark Office*